(12) United States Patent
Lu

(10) Patent No.: US 7,478,056 B1
(45) Date of Patent: Jan. 13, 2009

(54) ACTIVATING A COMMUNICATIONS SYSTEM

(75) Inventor: Larry L. Lu, Great Falls, VA (US)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 677 days.

(21) Appl. No.: 10/134,770

(22) Filed: Apr. 30, 2002

Related U.S. Application Data

(60) Provisional application No. 60/343,180, filed on Dec. 31, 2001.

(51) Int. Cl.
*G06Q 30/00* (2006.01)

(52) U.S. Cl. .......................................... 705/26; 705/37

(58) Field of Classification Search .................... 705/26, 705/37
See application file for complete search history.

(56) References Cited

U.S. PATENT DOCUMENTS

| | | | |
|---|---|---|---|
| 4,632,836 A | 12/1986 | Abbott et al. | |
| 5,539,822 A | 7/1996 | Lett | |
| 5,710,887 A | 1/1998 | Chelliah et al. | |
| 5,864,757 A | 1/1999 | Parker | |
| 5,956,693 A | 9/1999 | Geerlings | |
| 5,970,469 A | 10/1999 | Scruggie et al. | |
| 5,983,199 A | 11/1999 | Kaneko | |
| 6,026,375 A | 2/2000 | Hall et al. | |
| 6,081,793 A | 6/2000 | Challener et al. | |
| 6,124,800 A | 9/2000 | Beard et al. | |
| 6,172,677 B1 | 1/2001 | Stautner et al. | |
| 6,175,833 B1 | 1/2001 | West et al. | |
| 6,182,795 B1 | 2/2001 | Boerer | |
| 6,185,541 B1 | 2/2001 | Scruggie et al. | |
| 6,189,003 B1 | 2/2001 | Leal | |
| 6,189,029 B1 | 2/2001 | Fuerst | |
| 6,219,696 B1 | 4/2001 | Wynblatt et al. | |
| 6,219,793 B1 | 4/2001 | Li et al. | |
| 6,224,486 B1 | 5/2001 | Walker et al. | |
| 6,230,185 B1 | 5/2001 | Salas et al. | |
| 6,282,421 B1 * | 8/2001 | Chatterjee et al. | ........ 455/435.1 |

OTHER PUBLICATIONS

Covigo, Inc.—formerly PhoneSpan—Raises $12 Million From Norwest Venture Partners, Nokia Venture Partners And Leading Angel Investors Business Editors/High-Tech Writers. Business Wire. New York; Aug. 1, 2000, 3 pages, downloaded from ProQuest Direct on the Internet on Apr. 11, 2007.*

Mike King, Big Hang-ups in getting cell phones activated, The Gazette, Montreal, Quebec, Dec. 30, 1998, downloaded from ProQuest on the Internet on Aug. 6, 2008, 3 pages.*

(Continued)

*Primary Examiner*—James Zurita
(74) *Attorney, Agent, or Firm*—Fish & Richardson P.C.

(57) ABSTRACT

Activating a communications system or device may include receiving a subscription or service advertisement or solicitation response, recording an identifier specified by the responding party, receiving an activation request from a device through which the subscription or service may be rendered, receiving a unique identifier for that device and a screen name of an activation requestor operating the device, and activating the device upon confirmation that the screen name received with the unique identifier for the device relates to the recorded identifier specified by the party responding to the advertisement or solicitation. Furthermore, as described, devices may be distributed without recognizing or pre-configuring a relationship between the device, the service, and/or the recipient, all the while enabling such configuration to be established once the device is received by a valid and recognizable recipient. In this manner, provisioning of devices is simplified.

24 Claims, 9 Drawing Sheets

OTHER PUBLICATIONS

Com Delivers Palm VII Organizer Nationwide with New Pricing, Service Plans, Business Editors/High-Tech Writers. Business Wire, New York, Oct. 4, 1999, downloaded from ProQuest on the Internet on Aug. 6, 2008, 6 pages.*

Pinkerton, Janet, Wireless meets computing, again. The other side of convergence. Dealerschope, Philadelphia, Nov. 2000, vol. 42, Issue 11, downloaded from ProQuest on the Internet on Aug. 6, 2008, 6 pages.*

* cited by examiner

US 7,478,056 B1

ACTIVATING A COMMUNICATIONS SYSTEM

CROSS-REFERENCE TO RELATED APPLICATIONS

This application claims priority to U.S. Provisional Application No. 60/343,180, filed Dec. 31, 2001, and titled "ACTIVATING A COMMUNICATIONS SYSTEM."

TECHNICAL FIELD

This invention relates to mobile communications systems.

BACKGROUND

Online vendors constantly offer new products and services to enhance the quality of the online experience for customers while pursuing new revenue opportunities. Already, customers can purchase numerous goods and services online including books, movies, and tickets.

As part of providing services, vendors of mobile and wireless devices must provide the devices and often must enable access to one or more carrier or online networks. Depending on carrier and network configuration, enabling access to a carrier or online network may require customer information.

SUMMARY

In one general aspect, a communication device may be activated by receiving a request by an online operator for activation of a communications device and recording identification information obtained incident to the request by the online operator. When an activation request from the communications system is received and includes identification information from an operator of the communications device, the communications device is activated upon confirmation that the identification information received from the operator of the communications device relates the recorded identification information obtained incident to the request by the online operator.

Implementations may include one or more of the following features. For example, the communications device with the unique identifier may be provided to the online operator. The request is received from the online operator across a wide area network, which may include the Internet and the World Wide Web. A unique identifier may be received for the communications device.

The unique identifier may be associated with the recorded identification information of the online operator. Receiving the request may include receiving at least one of a HTML form, an e-mail message, and an instant message from the online operator. Accessing payment information may include accessing account information by referencing an account associated with the identification information.

The communications device may include a mobile text messenger, a personal digital assistant, or a wireless phone. The identification may include a login name, an online account name, an electronic mail address, an instant messenger name, a profile name, and a screen name.

The communications device may be preloaded with the identification information obtained incident to the request by the online operator prior to shipping the communications device. The identification information obtained incident to the request by the online operator may be unique. Activating the communication device may include loading a profile associated with the online operator requesting activation, with the profile personalizing one or more applications on the communications system.

Activating the communications device may include enabling the communications system to access a database of identities and associated unique identification numbers upon entry of an identity. The database may reside with a mobile carrier or an online service provider.

The online identity associated with the identification information may be prevented from being used to activate more than one communications device per request. The online identity may be prevented from being associated with more than one communications device per request unless the request provides for activation of multiple communications devices.

The online operator may acquire the communications system independently of responding to activate the communications device.

Relating the recorded identification information obtained incident to the request by the online operator may include matching the recorded identification information obtained incident with the request by the online operator. The request may be submitted by the online operator using non-Internet submissions.

In another general sense, activating a subscription to an online service provider and a communications device may be performed by receiving a subscription request including a requested identity from an inactive communications device, determining whether the identity is assigned to a pre-existing subscriber of the online service provider, and activating a new subscription and activating the communications device when the requested identity has not been assigned to a pre-existing subscriber.

The communications device may be associated with the identity. Payment information may be received from the communications device.

In another general sense, a customer may seek activation for a communications device by obtaining an inactive communications device, using an interface of the inactive communications device to enter identification information associated with a pre-existing subscription to an online service provider into the inactive communications device, and submitting a request for activation of the inactive communications device based on the identification information entered using the interface of the inactive communications device.

Payment information for communications device activation may be received using the interface of the communication device. An interface of the inactive communications system may be used to enter into the communication device identification information that does not identify a pre-existing subscriber of the online service provider into the communication device; and to submit a request. An interface other than the interface of the communication device may be used to make a request for a communication device.

Identification information may be associated with a request for a communication device. The identification information may be used to determine whether the request for activation is granted. A request submission may be fielded by the communication device, which compares the identification information entered against one or more identities that are pre-approved for activated use of the communication device.

In another general sense, activating a communications device may be performed online by receiving identification information from an inactivated communications system, searching for subscription information relating to the identification information received, and activating the inactivated communications system based on search results obtained based on the identification information received.

The identification information may include a screen name. Prior to activation, the inactivated communications system may be inoperative except to activate the inactivated communications system.

These and other general aspects may be implemented by an apparatus and/or a computer program stored on a computer readable medium. The computer readable medium may be a disk, a client device, a host device, and/or a propagated signal.

Other features and advantages will be apparent from the following description, including the drawings, and the claims.

DESCRIPTION OF DRAWINGS

Like reference symbols in the various drawings indicate like elements.

DETAILED DESCRIPTION

Activating a communications system or device may include receiving a subscription or service advertisement or solicitation response, recording an identifier specified by the responding party, receiving an activation request from a device through which the subscription or service may be rendered, receiving a unique identifier for that device and a screen name of an activation requestor operating the device, and activating the device upon confirmation that the screen name received with the unique identifier for the device relates to the recorded identifier specified by the party responding to the advertisement or solicitation. Furthermore, devices may be distributed without recognizing or preconfiguring a relationship between the device, the service, and/or the recipient, all the while enabling such configuration to be established once the device is received by a valid and recognizable recipient. In this manner, provisioning of devices is simplified.

For illustrative purposes, FIGS. 1-6 describe a system for implementing techniques for activating a mobile communications system. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
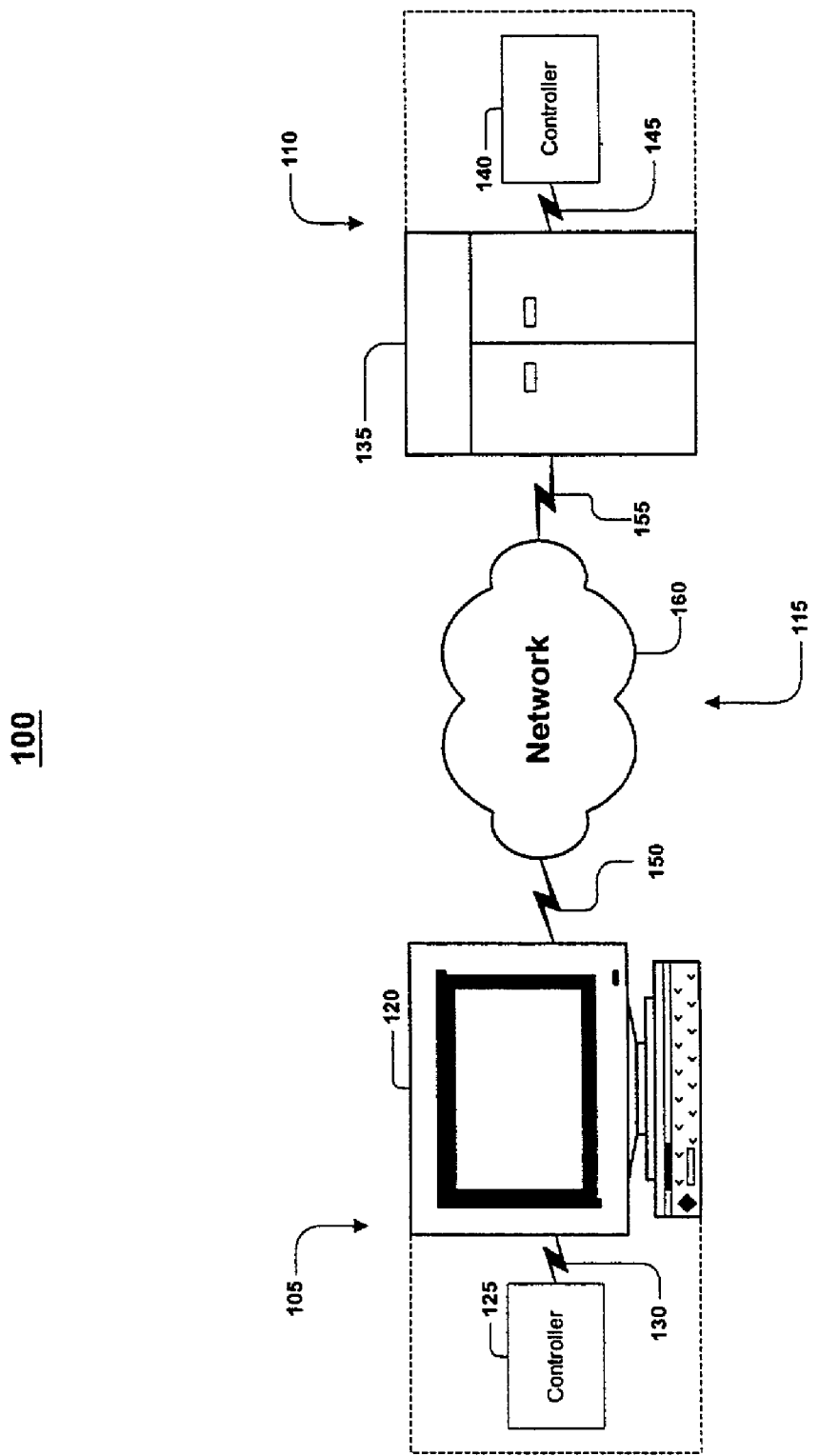
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125. For example, the client system 105 may include one or more general-purpose computers (e.g., personal computers), one or more special-purpose computers (e.g., devices specifically programmed to communicate with each other and/or the host system 110), or a combination of one or more general-purpose computers and one or more special-purpose computers. The client system 105 may be arranged to operate within or in concert with one or more other systems, such as for example, one or more LANs ("Local Area Networks") and/or one or more WANs ("Wide Area Networks").

The client device 120 is generally capable of executing instructions under the command of a client controller 125. The client device 120 is connected to the client controller 125 by a wired or wireless data pathway 130 capable of delivering data.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, or xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

The host system 110 includes a host device 135 capable of executing instructions under the command and direction of a host controller 140. The host device 135 is connected to the host controller 140 by a wired or wireless data pathway 145 capable of carrying and delivering data.

The host system 110 typically includes one or more host devices 135 and/or host controllers 140. For example, the host system 110 may include one or more general-purpose computers (e.g., personal computers), one or more special-purpose computers (e.g., devices specifically programmed to communicate with each other and/or the client system 105), or a combination of one or more general-purpose computers and one or more special-purpose computers. The host system 110 may be arranged to operate within or in concert with one or more other systems, such as, for example, one or more LANs ("Local Area Networks") and/or one or more WANs ("Wide Area Networks")

The client device 120, the client controller 125, the host device 135, and the host controller 140 each typically includes one or more hardware components and/or software components. An example of client device 120 or host device 135 is a general-purpose computer (e.g., a personal computer) capable of responding to and executing instructions in a defined manner. Other examples include a special-purpose computer, a workstation, a server, a device, a component, other equipment or some combination thereof capable of responding to and executing instructions. An example of client controller 125 or host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described herein. The client controller 125 and the host controller 140 may be embodied permanently or temporarily in any type of machine, component, equipment, storage medium, or propagated signal capable of providing instructions to the client device 120 or the host device 135.

Figure 2:
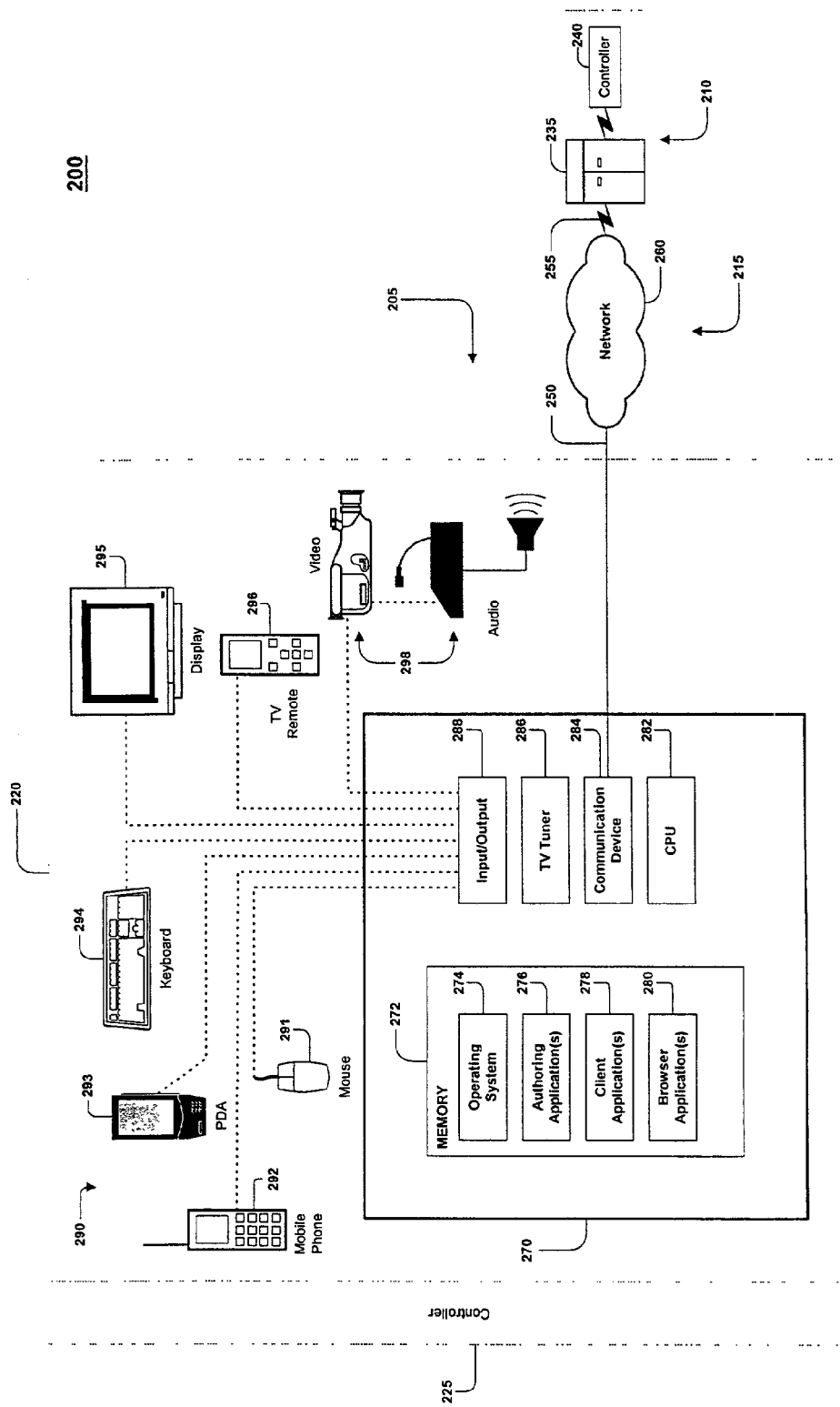
FIGS. 2-6 are block diagrams of expansions of aspects of the block diagram of FIG. 1.

FIG. 2 illustrates a communications system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communications system of FIG. 2 are broadly described above with respect to FIG. 1. In particular, the host system 210 and communications link 215 typically have attributes comparable to those described with respect to host system 110 and communications link 115 of FIG. 1. Likewise, the client system 205 of FIG. 2 typically has attributes comparable to and illustrates one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, or Linux) and one or more application programs. Examples of application programs include authoring applications 276 (e.g., word processing, database programs, spreadsheet programs, or graphics programs) capable of generating documents or other electronic content; client applications 278 (e.g., AOL client, CompuServe client, AIM client, AOL TV client, or ISP client) capable of communicating with other computer users, accessing various computer resources, and viewing, creating, or otherwise manipulating electronic content; and browser applications 280 (e.g., Netscape's Navigator or Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and performed by one or more device(s) external to the general-purpose computer 270.

The general-purpose computer also includes a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a television ("TV") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 also includes an input/output interface 288 for wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, a TV remote control 296 for receiving information from and rendering information to subscribers, and an audio-visual input device 298.

Although FIG. 2 illustrates devices such as a mobile telephone 292, a PDA 293, and a TV remote control 296 as being peripheral with respect to the general-purpose computer 270, in another implementation, such devices may themselves include the functionality of the general-purpose computer 270 and operate as the client device 220. For example, the mobile phone 292 or the PDA 293 may include computing and networking capabilities and function as a client device 220 by accessing the delivery network 260 and communicating with the host system 210. Furthermore, the client system 205 may include one, some or all of the components and devices described above.

Figure 3:
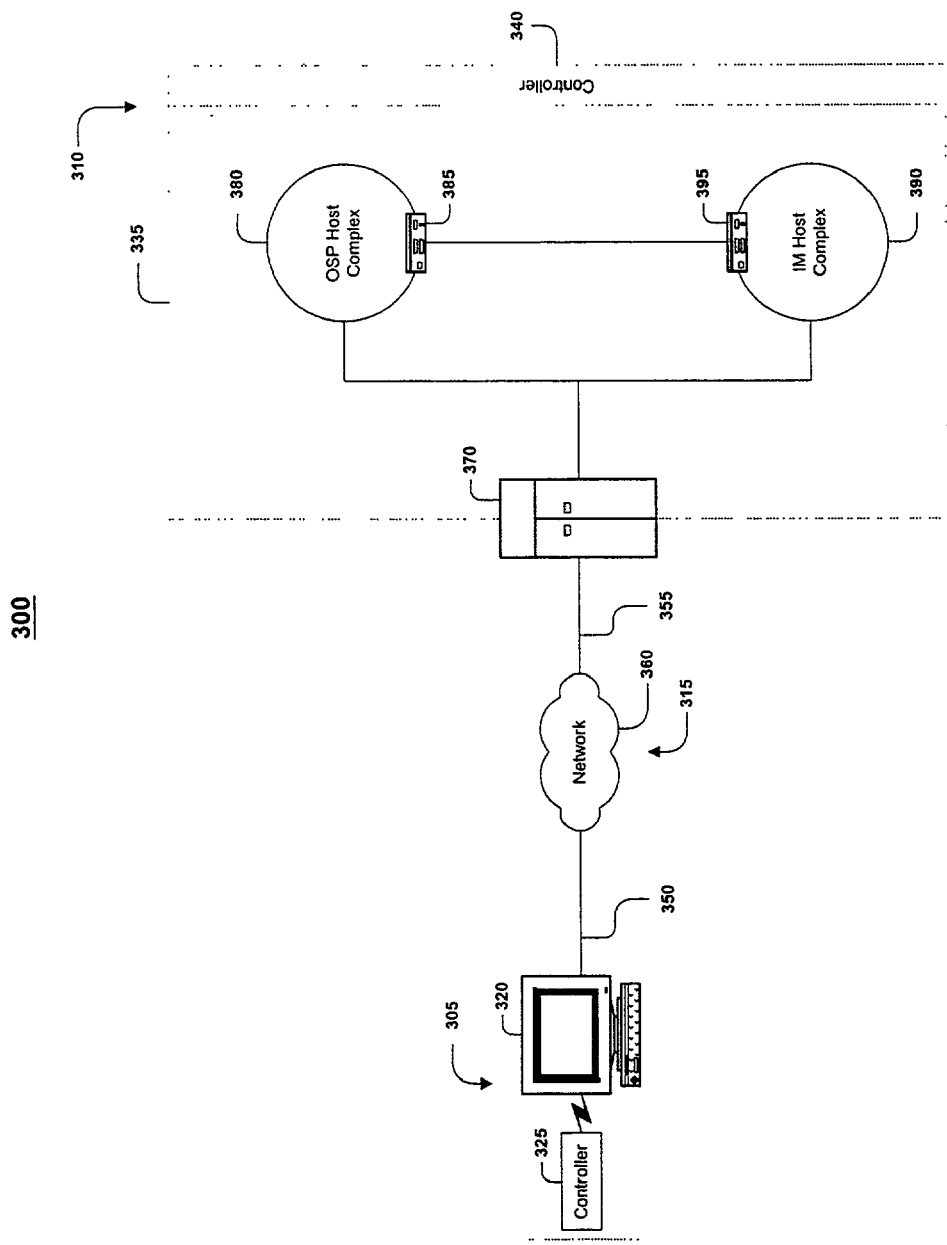

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communications system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and illustrates one possible embodiment of the host systems 110 and 210 shown in FIGS. 1 and 2, respectively.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 includes communication software, for example, an OSP client application and an IM client application. The OSP and IM communication software applications are designed to facilitate the subscriber's interactions with the respective services and, in particular, may provide access to all the services available within the respective host complexes.

Typically, the OSP host complex 380 supports different services, such as email, discussion groups, chat, news services, and Internet access. The OSP host complex 380 is generally designed with an architecture that enables the machines within the OSP host complex 380 to communicate with each other and employs certain protocols (i.e., standards, formats, conventions, rules, and structures) to transfer data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex gateway 395 may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding the protocol type anticipated by a destination complex, which enables any necessary protocol conversion to be performed incident to the transfer of data from one complex to another. For instance, the OSP host complex 380 and IM host complex 390 generally use different protocols such that transferring data between the complexes requires protocol conversion by or at the request of the OSP host complex gateway 385 and/or the IM host complex gateway 395.

Figure 4:
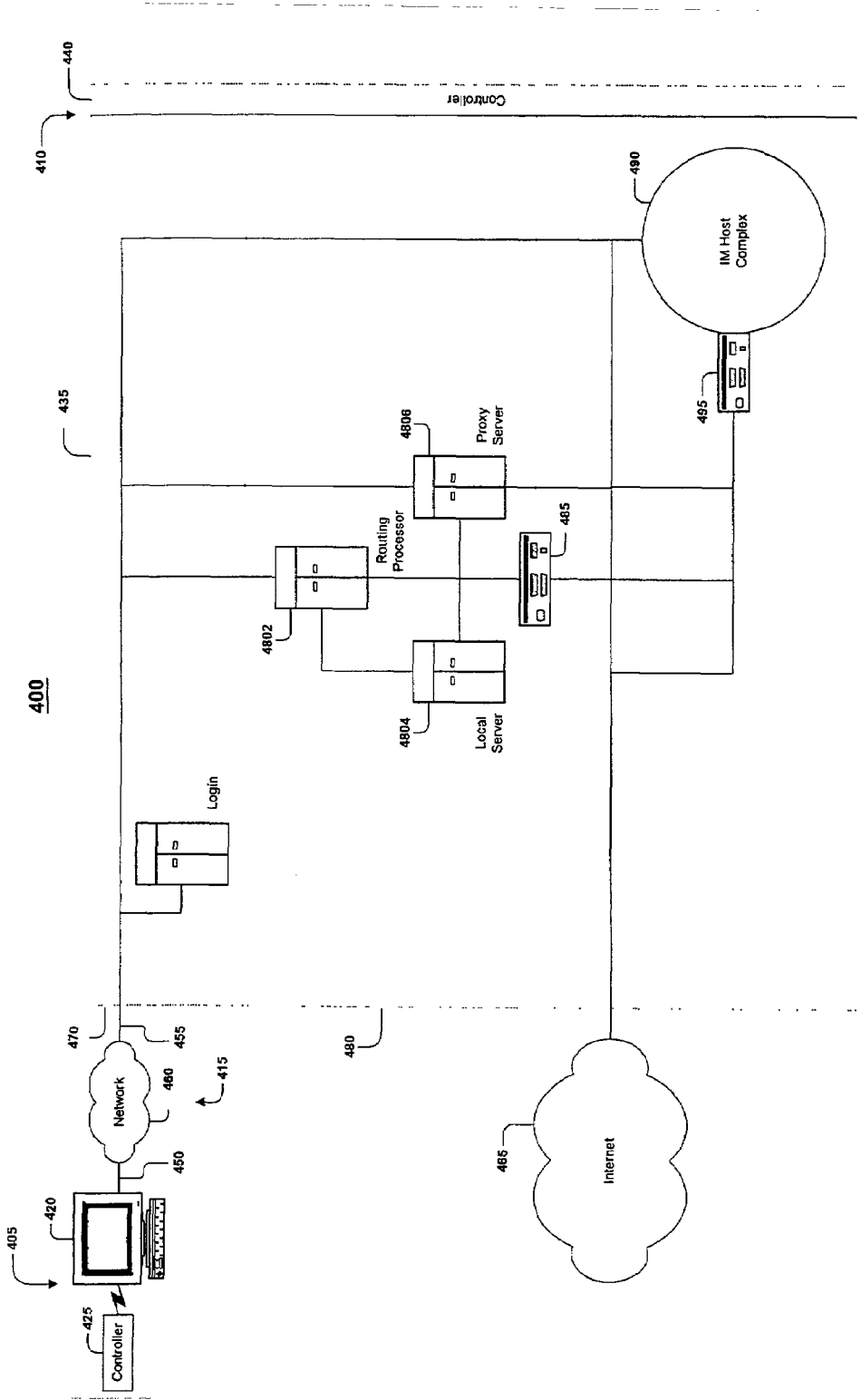

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 that enable communications through the one or more delivery networks 460. As shown, the client system 405 may access the Internet 465 through the host system 410.

Examples of each element within the communications system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and illustrates one possible implementation of the host systems 110, 210, and 310 shown in FIGS. 1-3, respectively. However, FIG. 4 describes an aspect of the host system 410, focusing primarily on one particular implementation of OSP host complex 480. For purposes of communicating with an OSP host complex 480, the delivery network 460 may include a telephone network.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using exclusive OSP protocols. The client controller 425 also may include applications, such as an IM client application, and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. However, in other implementations, as described above, the host controller 440 may include any of several other programs, machines, and devices operating independently or collectively to control the host device 435.

The host system 410 includes a login server 470 capable of enabling communications with and authorizing access by client systems 405 to various elements of the host system 410, including an OSP host complex 480 and an IM host complex 490. The login server 470 may implement one or more authorization procedures to enable simultaneous access to the OSP host complex 480 and the IM host complex 490. The OSP host complex 480 and the IM host complex 490 are connected through one or more OSP host complex gateways 485 and one or more IM host complex gateways 495. Each OSP host complex gateway 485 and IM host complex gateway 495 may perform any protocol conversions necessary to enable communication between the OSP host complex 480, the IM host complex 490, and the Internet 465.

The OSP host complex 480 supports a set of services from one or more servers located internal to or external from the OSP host complex 480. Servers external to the OSP host complex 480 generally may be viewed as existing on the Internet 465. Servers internal to the OSP complex 480 may be arranged in one or more configurations. For example, servers may be arranged in centralized or localized clusters in order to distribute servers and subscribers within the OSP host complex 480.

In the implementation of FIG. 4, the OSP host complex 480 includes a routing processor 4802. In general, the routing processor 4802 will examine an address field of a data request, use a mapping table to determine the appropriate destination for the data request, and direct the data request to the appropriate destination. In a packet-based implementation, the client system 405 may generate information requests, convert the requests into data packets, sequence the data packets, perform error checking and other packet-switching techniques, and transmit the data packets to the routing processor 4802. Upon receiving data packets from the client system 405, the routing processor 4802 may directly or indirectly route the data packets to a specified destination within or outside of the OSP host complex 480. For example, in the event that a data request from the client system 405 can be satisfied locally, the routing processor 4802 may direct the data request to a local server 4804. In the event that the data request cannot be satisfied locally, the routing processor 4802 may direct the data request externally to the Internet 465 or the IM host complex 490 through the gateway 485.

The OSP host complex 480 also includes a proxy server 4806 for directing data requests and/or otherwise facilitating communication between the client system 405 and the Internet 465. The proxy server 4806 may include an IP ("Internet Protocol") tunnel for converting data from OSP protocol into standard Internet protocol and transmitting the data to the Internet 465. The IP tunnel also converts data received from the Internet in the standard Internet protocol back into the OSP protocol and sends the converted data to the routing processor 4802 for delivery back to the client system 405.

The proxy server 4806 also may allow the client system 405 to use standard Internet protocols and formatting to access the OSP host complex 480 and the Internet 465. For example, the subscriber can use an OSP TV client application having an embedded browser application installed on the client system 405 to generate a request in standard Internet protocol, such as HTTP ("Hypertext Transport Protocol"). In a packet-based implementation, data packets may be encapsulated inside a standard Internet tunneling protocol, such as, for example, UDP ("User Datagram Protocol") and routed to the proxy server 4806. The proxy server 4806 may include a L2TP ("Layer Two Tunneling Protocol") tunnel capable of establishing a point-to-point protocol (PPP) session with the client system 405.

The proxy server 4806 also may act as a buffer between the client system 405 and the Internet 465, and may implement content filtering and time saving techniques. For example, the proxy server 4806 can check parental controls settings of the client system 405 and request and transmit content from the Internet 465 according to the parental control settings. In addition, the proxy server 4806 may include one or more caches for storing frequently accessed information. If requested data is determined to be stored in the caches, the proxy server 4806 may send the information to the client system 405 from the caches and avoid the need to access the Internet 465.

Figure 5:
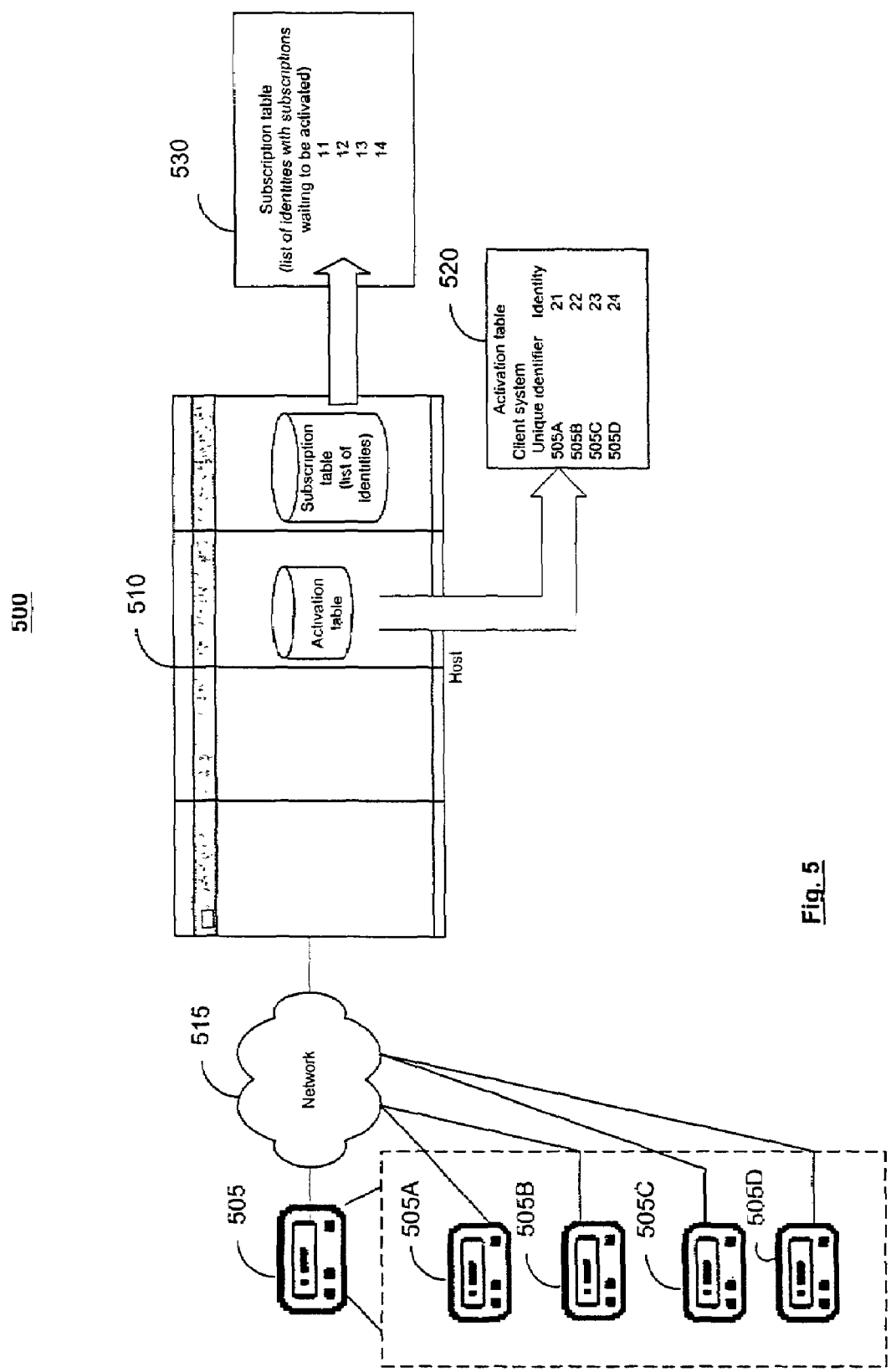

Referring to FIG. 5, a communications system 500 is capable of exchanging and delivering information between a client system 505 and a host system 510 through a communications link 515.

Examples of each element within the communications system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4. Likewise, the host system 510 of FIG. 5 may have attributes comparable to and illustrates one possible embodiment of the host systems 110, 210, 310, and 410 shown in FIGS. 1-4, respectively. However, FIG. 5 describes an aspect of the host system 510, focusing primarily on one particular implementation enabling a client system 505 to access subscription and activation data residing on the host 510 for the purpose of activating the a communications system.

The client system 505 is generally capable of establishing a connection to the host system 510. The client system 505 also may include applications, such as an OSP client application and/or an Internet browser application, for communicating with the host 510, other hosts, and/or the Internet 565. The applications may include an identity (e.g., screen name, profile, and/or login name) that may be used to authenticate and/or personalize access to resources.

The host system 510 includes an activation table 520 and a subscription table 530. Generally, the activation table 520 maintains a list of unique identifiers that are authorized to use a communications network (e.g., the Internet or the Wireless Web). The activation table 520 may include an identity (e.g., screen name, profile, and/or login name) associated with the unique identifier. A carrier looking to authenticate access to a client system 505 may poll the host to determine if the unique identifier and/or identity are found in the activation table 520. As is shown with respect to FIG. 5, a client system (client system 505A) has been activated for a user with an identity 21. Similarly, client systems with unique identifiers B, C, and D (e.g., client systems 505B, 505C and 505D) have been activated for identities 22, 23 and 24 respectively.

The subscription table 530 maintains a list of identities (e.g., a screen name, a profile, and/or a login name) for customers who have purchased (or leased) a subscription and/or a client system 505. As is shown with respect to FIG. 5, the subscription table 530 includes identities 11, 12, 13, and 14. In some cases, when an identity associated with a subscription is verified in the subscription table 530, the identity is removed from the subscription table 530. Although not required, the removed identity then may be placed in the activation table 520 along with an associated unique identifier. Thus, the use of an identity activated on one communication system 500 may be precluded on other communications systems 500. Similarly, the use of the communications system by another identity also may be stopped in another configuration.

Figure 6:
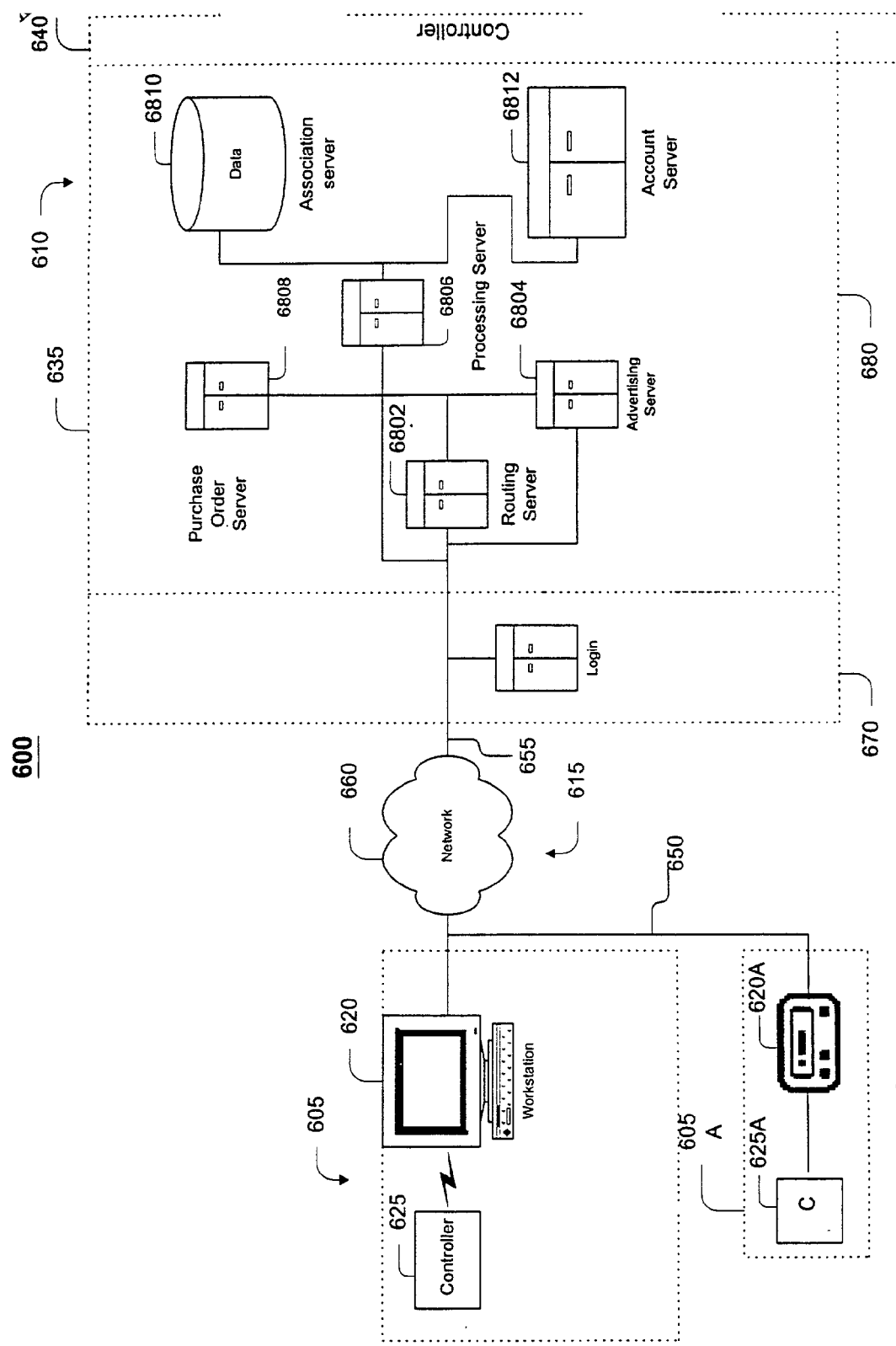

Referring to FIG. 6, a communications system 600 is capable of delivering and exchanging information between a client system 605 and a host system 610 through a communication link 615. Client system 605 typically includes one or more client devices 620, one or more client controllers 625 for controlling the client devices 620, and a mobile communications system 605A. Host system 610 typically includes one or more host devices 635 and one or more host controllers 640 for controlling the host devices 635. The communication link may include communication pathways 650, 655 enabling communications through the one or more delivery networks 660. The network 660 may be any known or described delivery network including, but not limited to, a telephone network and/or the Internet.

Examples of each element within the communications system of FIG. 6 are broadly described above with respect to FIGS. 1-5. In particular, the client system 605, host system 610, and the communications link 615 typically have attributes comparable to those described with respect to client systems 105, 205, 305, 405, and 505, host systems 110, 210, 310, 410, and 510, and communications links 115, 215, 315, 415, and 515 of FIGS. 1-5. Of these systems, FIG. 6 describes an aspect of the host system 610, focusing primarily on one particular implementation of the host device 635.

Similar to the client systems described previously, client system 605 includes a client device 620 and a client controller 625, where the client controller 625 is generally capable of establishing a connection to the host system 610 through the delivery network 615. One particular implementation of a client system 605 is also shown by FIG. 6 and identified as a mobile communications system (MCS) 605A that is structured and arranged to enable communications without connectivity to a fixed or physical communications line. Typically, the MCS includes elements that are found in client systems 105, 205, 305, 405, and 505. Examples of the MCS 605A may include devices such as the mobile phone 292 and PDA 293 described in FIG. 2. Other examples of a MCS 605A may include a mobile device with a wireless or fixed (e.g., V.90 modem with RJ-11 connector) modem, a PDA, a special purpose device or component, or some combination thereof capable of responding to and transmitting communications without access to the fixed or physical communications line. Still another example of the mobile communications system ("MCS") 605A may include a mobile text messenger with an input mechanism to enable two-way communications. However, for reasons relating to functions that will be described with respect to FIGS. 7-8, the MCS 605A is represented as a system distinct from the client system 605. When the following specification describes a client system interacting with a host system to order a MCS 605A, the client system is not limited to being a desktop system. Thus, implementations also may include the client system 620 being a mobile device similar or identical to the MCS 605A. For example, the client device 620 and the mobile communication device 620A both may include two mobile text messengers.

The MCS 605A may include a mobile communication device 620A and a mobile communication controller 625A. Each of the mobile communication device 620A and the mobile communication controller 625A typically includes one or more hardware components and/or software components.

The mobile communication device 620A shares many common features with client device 620, particularly in that it establishes and leverages communications with host device 610. Mobile communications device 620A is portable and/or wireless. In addition, as one type of client device, an example of a mobile communication device 620A is a mobile pager with a general-purpose processor (e.g., a mobile text messenger) capable of responding to and executing instructions in a defined manner. The mobile communication device 620A typically includes an input/output device, such as, for example, a keypad and/or a liquid crystal display ("LCD"), and a communications interface for exchanging data with the communications link 650.

The mobile communication controller 625A includes one or more software applications structured and arranged to govern the operation of the mobile communication device 620A and to enable the mobile communication device to interface with other systems (e.g., host system 610). An example of a mobile communication controller 625A is a software application loaded on the mobile communication device 620A for commanding and directing communications enabled by the MCS 605A. Other examples of controller 625A include a program, a piece of code, an instruction, a device, a computer, a computer system, or a combination thereof, for independently or collectively instructing the mobile communication device 620A to interact and operate as described herein. The mobile communication controller 625A may be embodied permanently or temporarily in any type of machine, component, equipment, storage medium, or propagated signal capable of providing instructions to the mobile communication device 620A.

In some implementations, the MCS 605A or a mobile communication device 620A therefore may include an identifier that is unique to the device. For example, a wireless device may include an electronic serial number ("ESN") and a manufacturer serial number ("MSN"). Either or both of the ESN and MSN may be used as or used to generate a unique identifier. Typically, a wireless carrier may use this information to enable access to a wireless network. Other systems may use other forms of unique identifiers depending on the technology underlying the system. Examples of underlying technology include Code Division Multiple Access ("CDMA"), Global System for Mobile Communications ("GSM"), Advanced Mobile Phone Service ("AMPS"), Time Division Multiple Access ("TDMA"), and/or General Packet Radio Service ("GPRS").

Although the MCS 605A appears as part of the client system 605, implementations of the MCS 605A may be controlled and operated by other organizations and systems at various times. For example, the MCS 605A initially may be configured or controlled by a provider of the MCS 605A. This will be described further with respect to the operation of the system in FIGS. 7 and 8.

The host system 610 includes a host device 635 and a host controller 640. The host controller 640 generally is capable of transmitting instructions to any or all of the elements of the host device 635. For example, in one implementation, the host controller 640 includes one or more software applications loaded on one or more elements of the host device 635. However, in other implementations, as described above, the host controller 640 may include any of several other programs, machines, and devices operating independently or collectively to control the host device 635. The host device 635 includes a login server 670 capable of enabling communications with and authorizing access by client systems 605 to various elements of the host system 610 including the OSP host complex 680 of host device 635.

As shown in FIG. 6, the OSP host complex 680 of the host device 635 includes a routing server 6802, an advertising server 6804, a processing server 6806, a purchase order server 6808, an association server 6810, and an account server 6812. The routing server 6802 is configured to directly or indirectly route data packets to a specified destination within or outside of the OSP host complex 680, such as, for example to one or more of the advertising server 6804, the processing server 6806, the purchase order server 6808, the associating server 6810, and the account server 6812.

The advertising server 6804 is structured and arranged to deliver online advertisements and receive responses to transmitted advertisements with one or more client systems 605. Typically, the advertising server 6804 will include a collection of advertisements to be transmitted, a list of one or more entities to whom an advertisement is to be transmitted, and the ability to receive a response to the advertisement. An online advertisement typically includes a description of a product being offered, and the ability to respond to the advertisement with an indication that an entity intends to purchase the product offered in the online advertisement.

Although the advertising server 6804 is depicted as part of the host system 610, the advertising server 6804 may be operated by a separate organization or entity. For example, the advertising server 6804 may be operated by an online advertiser, a carrier, or an equipment manufacturer. In any event, the advertising server 6804 generally includes the ability to receive a response to an advertisement and transmit to a processing server 6806 some information about the client system 605 transmitting the response.

The processing server 6806 is structured and arranged to receive data (e.g., from the advertising server 6804) indicating that the client system 605 intends to purchase the product featured in an online advertisement. The processing server 6806 also is capable of interfacing with a MCS provider to coordinate delivery of a MCS 605A to the user of the client system 605 that responded to the online advertisement. The processing server 6806 also is capable of coordinating with a MCS provider to receive a unique identifier from the MCS provider.

The purchase order server 6808 is structured and arranged to enable a host 610 to coordinate payment information for a good or service purchased by a user. Generally, the purchase order server 6808 accesses an account server 6812 for the account information of a user and charges the cost of the purchased good or service against that account.

The association server 6810 is structured and arranged to associate an online identify (e.g., an OSP screen name) for an account with the unique identifier for a MCS 605A. Generally, associating a screen name with the unique identifier includes enabling a MCS 605A with the unique identifier to access the network and reference the association server 6810 to determine if a screen name entered at the device corresponds to the unique identifier associated with the screen name at the host.

The account server 6812 is structured and arranged to store financial and payment information about one or more users of the OSP. Generally, the account server 6812 includes information about how the user reimburses a host 610 for access to one or more host services (e.g., Internet access, Instant messenger and electronic mail services). For example, the account server 6812 may include information about a credit card that can be provided to pay for charges against an account of the user.

Figure 7:
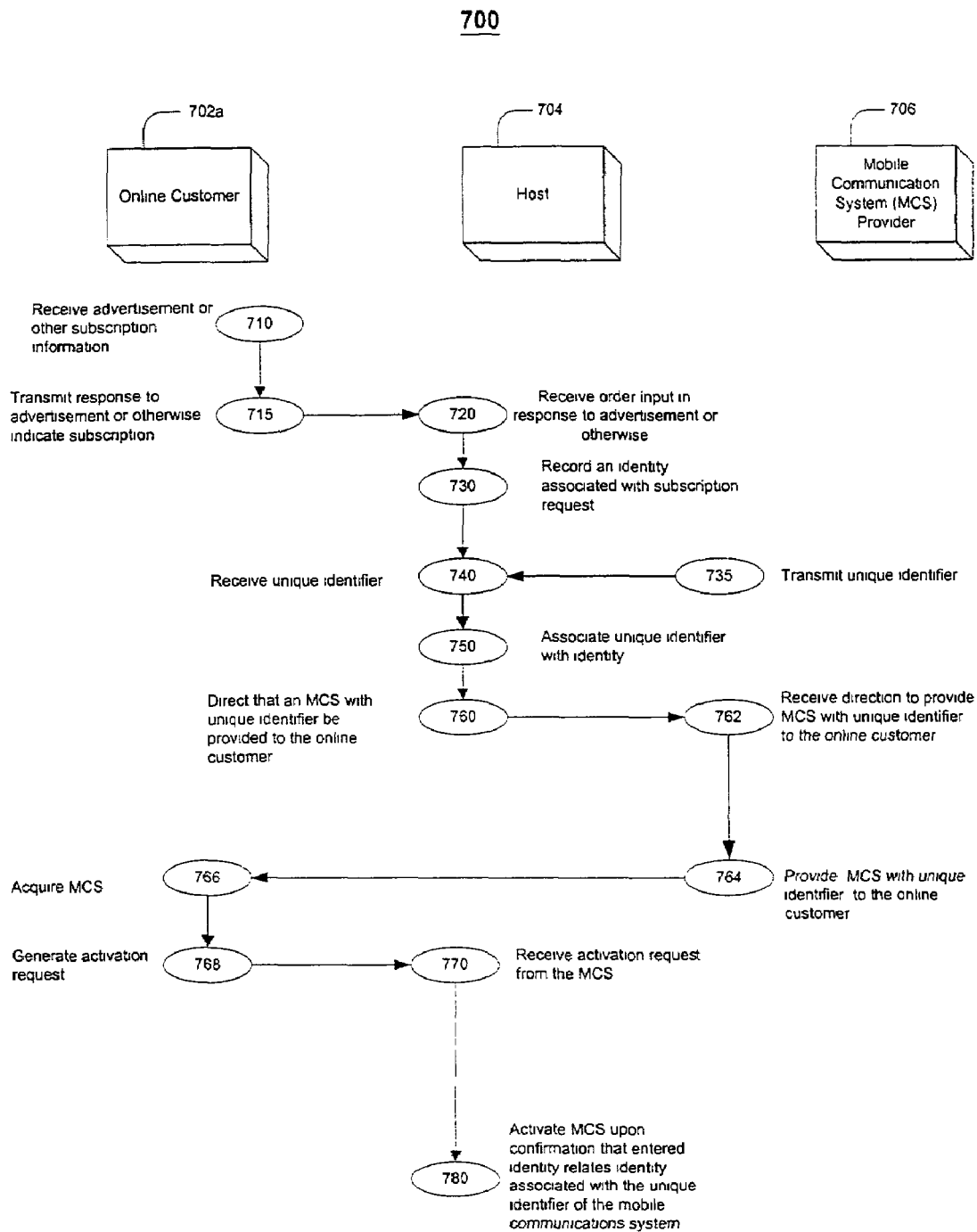
FIG. 7 is a flow chart illustrating a method of enabling a customer to activate a mobile communications system.

Referring to FIG. 7, an online customer 702a, a host 704, and a mobile communications system provider 706 interact according to procedure 700 to activate a mobile communications system (e.g., mobile communications system 605A in FIG. 6).

Examples of each element of FIG. 7 are broadly described above with respect to FIGS. 1-6. In particular, online customer 702a typically has attributes comparable to those described with respect to client systems 105, 205, 305, 405, 505, 605, and 605A. The host 704 typically has attributes comparable to those described above with respect to host systems 110, 210, 310, 410, 510 and/or 610. The online customer 702a and the host 704 may be directly or indirectly interconnected through a known or described delivery network, which may have attributes comparable to those described with respect to delivery networks 115, 215, 315, 415, 515, and/or 615 of FIGS. 1-6. However, the procedure 700 may be implemented by any type of hardware, software, device, computer, computer system, equipment, component, program, application, code, storage medium, or propagated signal.

Generally, the mobile communications system provider 706 is an entity structured and arranged to enable, configure and/or provide a mobile communications system for one or more customers (e.g., online customer 702a). Examples of a mobile communications system provider 706 may include an equipment manufacturer, a fixed retail or online vendor, a carrier or wireless network provider, and/or a service provider. Although the mobile communications system provider 706 is depicted as a different system than the host 704, implementations may include a host 704 operating as a mobile communications system provider 706.

Initially, the online customer 702a receives or otherwise perceives an advertisement (step 710). Examples of advertisements transmitted to the online customer 702a may include a web page, an e-mail message, an instant message, a proprietary application or other form. The advertisement may be transmitted by a variety of organizations including a host 704, a mobile communications system provider 706, a mobile carrier, an online merchant, an online advertiser, a mobile communications system manufacturer, an online service provider or other organization. The advertisement generally includes a description identifying a mobile communications system being offered and a system enabling the online customer 702a to respond to the advertisement. For example, an online customer 702a may view a web page offering a mobile text messenger. The advertisement may be structured and arranged to generate an e-mail message response when the online customer 702a selects (e.g., "clicks on") a portion of the advertisement to indicate that the customer wants to purchase the device. Typically, the mobile communications system being offered includes the various forms of the mobile communications systems described in FIG. 6 (e.g., a mobile text messenger, an Internet-enabled PDA, an Internet appliance, or an Internet-enabled wireless phone).

In general, a mobile carrier describes a service provider that enables communications access to mobile providers. Typically, this includes carriers (e.g., telecommunications providers) enabling wireless access across leased spectrum in the case of wireless devices, or dial up access in the context of PDAs.

The online customer 702a transmits a response to an advertisement (or input to web page entry form) indicating that the online customer 702a wants to purchase a mobile communications system (step 715). Transmitting a response to an advertisement may include transmitting a HTML form, an instant message, an e-mail message or a message generated using another application in response to an advertisement. In one implementation, the response may be received across a wide area network. For example, the response may be received or transmitted across the Internet or the World Wide Web.

The response to the advertisement may include data regarding the identity of the online customer 702a. For example, the response to the advertisement may include a screen name, password information, or an Internet Protocol ("IP") address of the online customer 702a. Other implementations may employ a reference or link with additional information that may be accessed. For example, a response to an advertisement may include an encrypted account number. The transmission may be decrypted, and the account may be accessed (e.g., on account server 6812 in FIG. 6) to access a screen name, payment data, and a shipping address.

The response is not limited to the form in which the advertisement was received. For example, the advertisement may be received through a web browser and the response to the advertisement may be transmitted by a proprietary submission. Other examples of the response may include completing a paper application and/or using a telephone to place an order.

The host 704 receives the response to the advertisement indicating that a mobile communications system is to be purchased (step 720). Receiving the response may include recording one or more aspects of a transaction to purchase an MCS. For example, a device model number and quantity may be recorded along with account and identity information.

The host 704 records the identity for the online customer 702a that transmitted the response to the advertisement (step 730). In some implementations, recording the identity may involve identifying the screen name encapsulated in a response to an advertisement. For example, when a user selects an icon in an advertisement, the response generated by the action may automatically include the screen name in the transmission. Implementations may include recording an identity where the identity is not included in a response to an advertisement. For example, the response to an advertisement may include an IP address. The host 704 may examine system logs to determine which online customer 702a and associated identity was using the IP address when the response to advertisement was received.

The identity may be a login name. The login name is typically the name used to authenticate a user when enabling access to a network (e.g., an OSP). The identity also may be an online account name. For example, the online customer may use one name and password to login while being known to other online users by a separate name. The identity may include a screen name. The screen name may be associated with personalized and customizable settings for accessing OSP resources (e.g., weather for a particular region, a stock ticker with user specified symbols). Other implementations of an identity may include an e-mail address, an instant messenger name, and a profile name.

Implementations may include multiple aspects of the above. For example, an e-mail address may be identical or related to an instant messenger name and an online account name. The e-mail address may include the instant messenger name with a specified electronic mail extension (e.g., @aol.com).

Either in response to a request from the host, or in response to other inputs, the mobile communications system provider 706 transmits to host 704 a unique identifier corresponding to a mobile communications system (step 735). Typically, each mobile communications system has an associated unique identifier. Organizations that provide services to mobile communications systems may enable or deny access to services based in part on the unique identifier. For example, a wireless carrier may maintain a database of unique identifiers corresponding to devices authorized to access the wireless carrier network.

The mobile communications system provider 706 may provide unique identifiers in advance, regardless of whether there has been a response to an advertisement. For example, a mobile communications system provider 706 may provide several devices and associated unique identifiers to an intermediary (e.g., an online retailer) so that the devices may be provided in a more timely manner.

Implementations may include the mobile communications system having a programmable unique identifier. For example, a mobile text messenger may have programmable logic enabling a unique identifier to be entered.

The host 704 receives a unique identifier for a mobile communications system that will be provided to the online customer (step 740). The unique identifier generally corresponds to the unique identifier of a mobile communications system 605A described in FIG. 6.

Receiving the unique identifier may include receiving a unique identifier from a wireless carrier whose network the carrier will access. For example, the carrier may provide the unique identifier for a device residing in storage waiting for the carrier to enable and ship the mobile communications system.

The host 704 associates the provided unique identifier with the identity for the online customer (step 750). Associating the unique identifier with the identity generally includes loading both the unique identifier and the screen name into a database (e.g., the activation table 520, subscription table 530 or the association server 6810 in FIG. 6) such that a carrier, OSP, or other organization can verify and determine whether a given identity and unique identifier pair that has been received by the organization corresponds to the identity and unique identifier pair residing in the database.

Associating the unique identifier with the identity may include modifying a database residing with a mobile carrier or other organization distinct from the organization operating the host 704. For example, instances of the database of associated identities (e.g., activation table 520) and unique identifiers may reside on devices operated by a mobile carrier. Alternatively, the host 704 may maintain the database to which it enables access by and updates from other organizations. For example, an OSP may enable a mobile carrier to verify screen names and unique identifiers that are received.

The host 704 directs that a mobile communications system to the online customer 702a that responded to the advertisement (step 760). Directing the mobile communications system to the online customer 702a may include exchanging data with a mobile carrier who will ship the MCS to the online customer 702a. Exchanging data may include exchanging payment and account information, from, for example, account server 6812 in FIG. 6, as well as other information that permits the mobile communications system to be configured for operation by the online customer. For example, an OSP may provide the address of the online customer to the mobile carrier. In another example, the OSP may transfer funds electronically to reimburse the mobile communications system provider and debit the online customer for the cost of the service and equipment. Other implementations may include having the host 704 configure the mobile communications system and ship the mobile communications system to the online customer 702a.

The mobile communications system provider 706 receives the direction to provide the MCS to the online customer 702a (step 762). In response to the direction, the mobile communications system provider 706 provides the MCS to the online customer 702a (step 764).

The online customer 702a receives the mobile communications system (step 766). For example, the mobile communications system may be received by mail or other shipping. In another implementation, the online customer may visit a store that provides mobile communications systems to pick up the mobile communications system.

After receiving the mobile communications system, the online customer 702a generates an activation request (step 768). Typically, generating an activation request includes entering an identity in the mobile communications system. Entering the identity may include typing an identity (e.g., screen name) using a keypad of letters and numbers. Implementations also may include using an alphanumeric keypad such as the type commonly appearing on telephone systems, for example, the letters on a dial button of a telephone may be used to enter the identity. Other implementations of entering an identity into a mobile communications system may include entering the data on a LCD screen, or using a handwriting recognition system and/or a voice recognition system.

The host 704 receives the activation request (step 770). Receiving the activation request may include having a mobile carrier receive the activation request and extract the identity from the request. For example, a mobile carrier may receive an activation request, encapsulate the identity with the unique identifier that was received from the same request or another transmission, and transmit the encapsulated identity to the host 704. Receiving the activation request also may include having the host 704 directly receive a transmission with the unique identifier and the identity.

The host 704 activates the mobile communications system when the host 704 verifies that the identity entered in the activation request relates to the identity associated with the unique identifier of the mobile communications system (step 780). In some cases, relating may include matching the entered identity with an identity in a subscription table. However, relating the identity may include determining that the entered identity is associated with a valid account subscription. For example, an account may have several associated screen names. Verifying the screen name may include querying a database such as the association database 6810 described in FIG. 6 to determine if the screen name is associated with the unique identifier of the mobile communications system. Implementations also may include having the database forward identities and unique identifiers to other servers to verify the identity. For example, the database may forward entries of identities and unique identifiers to the edge of the mobile carrier network to increase system resiliency and responsiveness (e.g., a server located in a wireless switching center that routes traffic or located in a base station by the antenna arrays).

Upon verifying the identity for the online customer 702a, the host 704 activates access for the mobile communications system. This may include directing a mobile carrier to enable access for the mobile communications system with the unique identifier that has just been verified with that identity. For example, an OSP may inform a mobile carrier that a specified mobile text messenger is authorized to communicate with other systems across the mobile carrier's network.

In one implementation, the host 704 may enable an array of services associated with that identity. For example, activating access for a mobile communications system may include providing the online customer with an e-mail address book of other users. Another example may include enabling access to a list of favorite web sites for easier access to the sites from the mobile communications system. Other implementations may include enabling access to other screen names and associated services for an online customer who has just activated the mobile communications system.

Once the access has been activated, the mobile communications system is allowed to access the mobile communications network and other devices on the network.

Figure 7A:
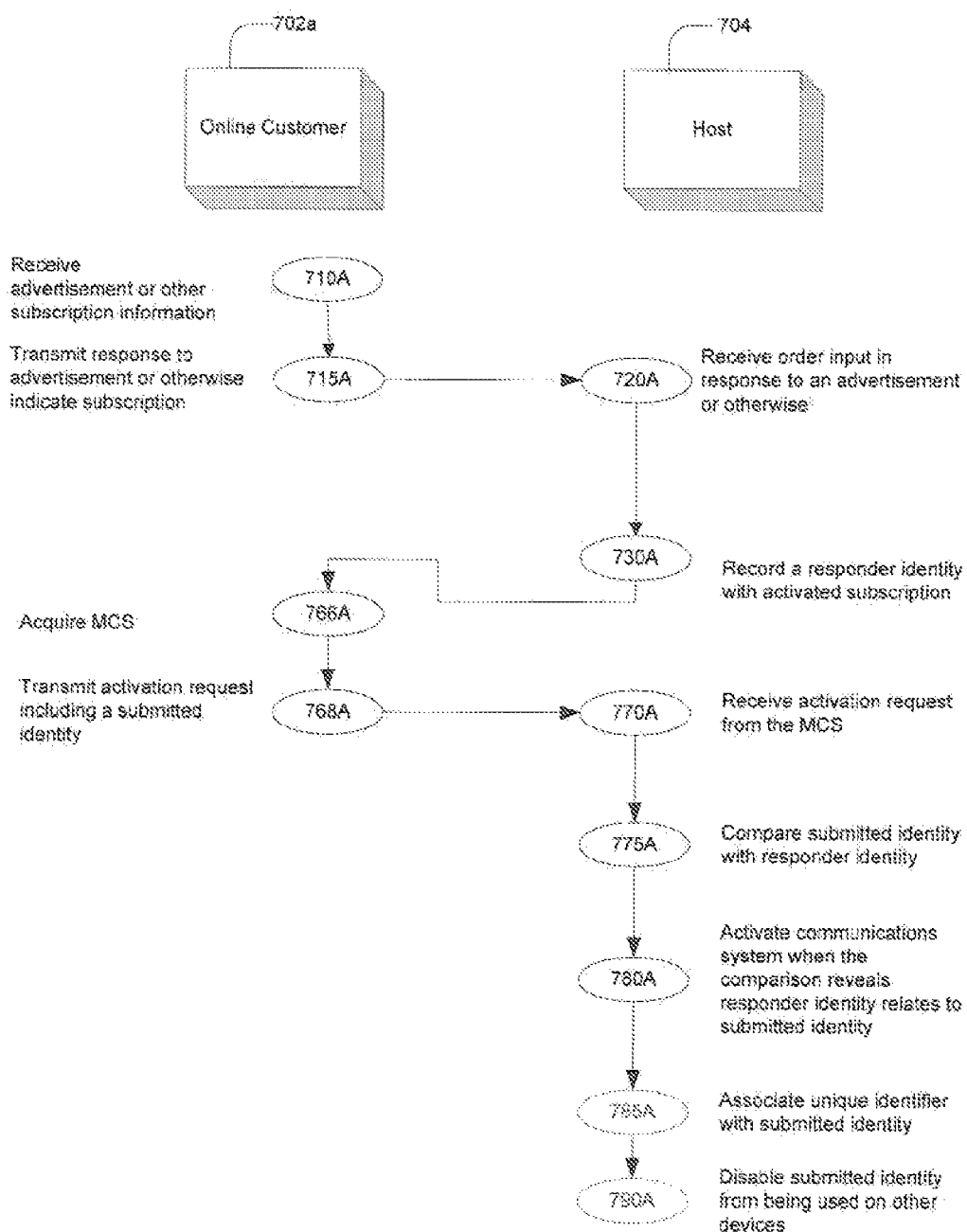
FIG. 7A is a flow chart illustrating a method of enabling a customer to activate a mobile communications system that has not been configured for the customer prior to customer receipt of the mobile communications system.

Referring to FIG. 7A, an online customer 702 and a host 704 interact according to another procedure 700A to activate a MCS (e.g., mobile communications system 605A in FIG. 6). In general, procedure 700A is similar to procedure 700 in that an online customer 702a responds to an online advertisement or otherwise provides information to activate a subscription for a MCS. Accordingly, many of the steps described in FIG. 7A or otherwise provides information will be similar to the steps described above. For example, aspects of receiving and responding to an advertisement (steps 710, 715, and 720) may be common. Similarly, the systems that implement procedure 700A may be similar to the systems described with respect to procedure 700. However, procedure 700A describes an adaptation of procedure 700 to enable a customer to purchase and use a MCS that has not been configured for the online customer prior to activation by submitting a screen name.

Initially, the online customer 702a receives an advertisement (step 710A). The online customer 702a then transmits a response to the advertisement to indicate that the online customer 702a wants to purchase a MCS (step 715A).

The host 704 receives the response to the advertisement (step 720A), and then records the identity for the online customer 702a that transmitted the response to the advertisement (step 730A). Each of steps 710A-730A are described in greater detail with respect to steps 710-730 of FIG. 7. Typically, recording the responder identity involves entering the screen name of the online customer 702a into a subscription database (e.g., subscription table 530). This subscription database then may be accessed by a carrier or service provider to determine whether an activation request corresponds to an activated subscription. In general, the identity will be removed from the subscription database when that subscription becomes associated with a particular MCS upon activation.

At some point, the online customer 702a acquires a MCS (step 766A). The acquisition may occur prior to or after any or all of steps 710A-730A. For example, the online customer 702a may visit a retail facility and purchase a MCS, or the online customer may purchase the MCS as part of responding to the advertisement, or from another online retailer, equipment manufacturer, and/or mobile carrier. The MCS need not be purchased. The MCS may be leased and/or used on a limited access basis (e.g., pay-per-use). For example, carrier access (e.g., wireless minutes) may be pre-paid, while services (e.g., messaging) are purchased in the activated subscription.

The MCS may include configuration information to access a particular carrier's network. For example, an MCS may be configured to operate in a certain spectrum, and/or access a particular carrier's resources. However, regardless of the source from which the MCS is acquired, the online customer 702a acquires a MCS that has not been pre-configured for their use, or with their identity or account information.

In any event, using the MCS, the online customer 702a transmits an activation request with their identity, as registered with host 704 (step 768A). A MCS unique identifier may be included in the activation request that is transmitted.

The host 704 receives the activation request (step 770A), and compares the submitted identity in the activation request with responder identity in the subscription database (step 775A). Upon confirmation that the responder identity corresponds to the submitted identity, the communications system is activated (step 780A).

Generally, activating the communications system associates the responder identity with a unique identifier of the communications system (step 785A), for example, in the activation table 520. This may be used to disable the identity from being used to activate other devices and/or disable the activated communications system from being used by other identities (step 790A), thus enhancing security. For example, associating the responder identity with the unique identifier may disable the identity from being used to activate other devices, unless the identity was registered for activation of more than one device, in which case several device identifiers may be associated with the single responder identity. Similarly, associating the responder identity with the unique identifier may disable the activated communications systems from being used by other identities. Alternatively, the identity may be free to activate other devices (e.g., with identities for each device associated with the respective identity) and/or the communications system may remain available for use by other authorized identities, as specified during registration or otherwise.

The activation request may be received through a system of pass-throughs and/or proxies between a carrier and a service provider. For example, a MCS may be using a wireless carrier to access a service provider. In this example, the wireless provider may record the unique identifier and forward an activation request to the host 704 to ask if the identity is associated with a valid subscription. Upon confirmation, the wireless carrier would enable the MCS with the validated unique identifier so as to enable access to the host 704 for further authentication and/or services.

Figure 8:
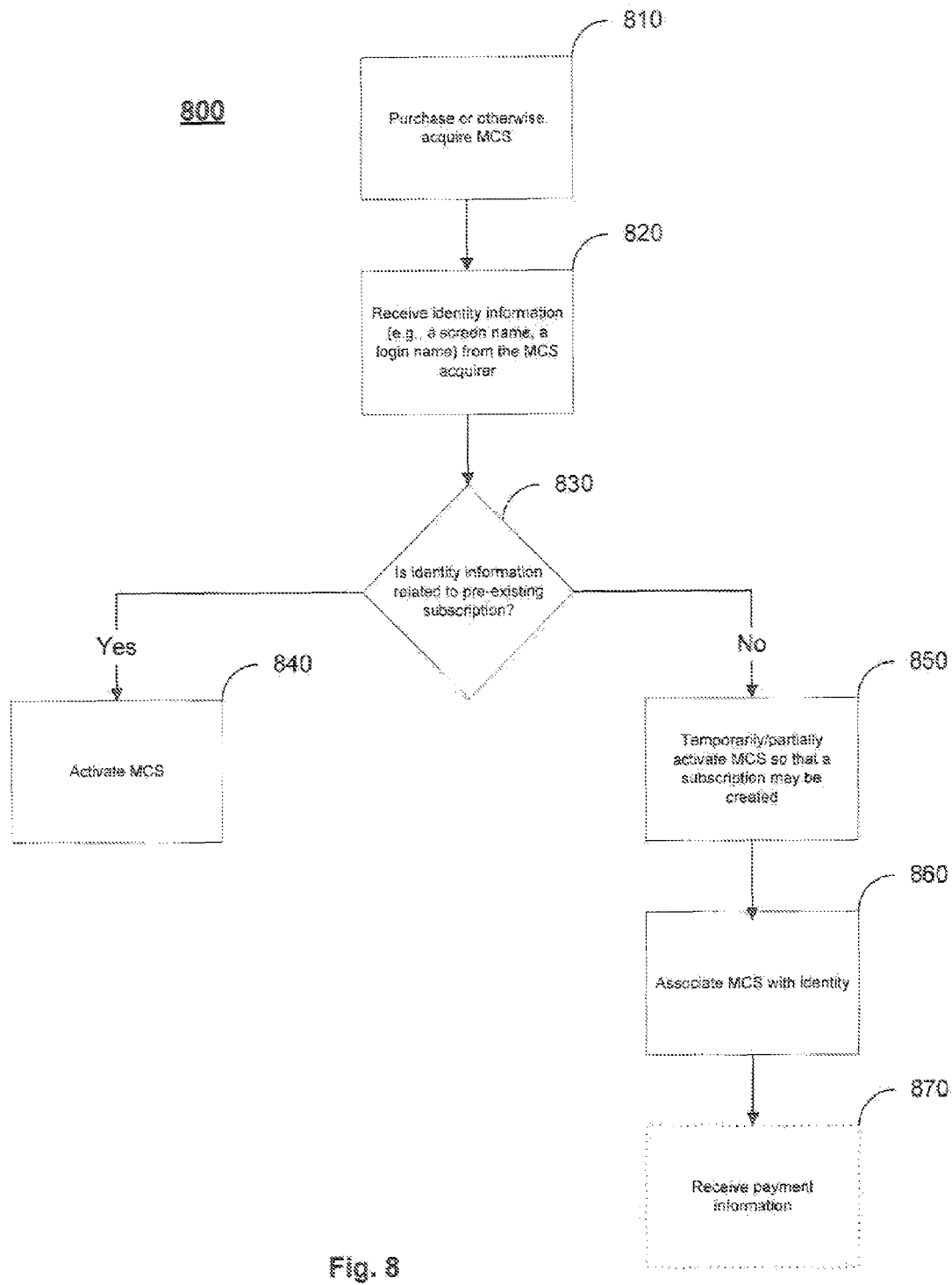
FIG. 8 is a flow chart illustrating a method of enabling a customer to activate a mobile communications system after taking receipt of the mobile communications system.

Referring to FIG. 8, a host operates according to a procedure 800 to activate a mobile communications system. In general, FIG. 8 illustrates how a communications system that has been acquired may be activated, depending on whether a valid subscription exists.

Examples of hosts capable of implementing procedure 800 of FIG. 8 are broadly described above with respect to FIGS. 1-6. In particular, the host typically has attributes comparable to those described above with respect to host devices 135, 235, 335, 435, 510, and 635 and/or host controllers 140, 240, 340, 440, and 640. However, the procedure 800 may be implemented by any type of hardware, software, device, computer, computer system, equipment, component, program, application, code, storage medium, or propagated signal.

Initially, a customer will purchase or otherwise acquire a MCS (step 810), as described, for example, previously with respect to step 766 of FIG. 7 or 766A of FIG. 7A. Identity information is received from the MCS acquirer (step 820). Typically, the identity information includes a name associated with an online identity and corresponds to the identity described above with respect to FIG. 7 (e.g., screen name, profile, e-mail address, IM name, login name).

After receiving the identity information, a determination is made as to whether the identity information is associated with a pre-existing subscription (step 830). Generally, determining whether the identity information is associated with a pre-existing subscription involves querying a database of identities associated with valid pre-existing subscriptions (e.g., subscription table 530). If the identity is associated with a valid pre-existing subscription, the MCS is activated (step 840). Typically, activating the MCS (step 840) includes enabling the MCS to communicate with other devices across a carrier network or service provider.

If the identity is not associated with a pre-existing subscription, the MCS may be used to then subscribe to an OSP or to leverage a current OSP subscription to enable activation. Subscribing to an OSP may include temporarily or partially activating the MCS so that a subscription may be created (step 850). Thus, activating the MCS to subscribe to an OSP may include activating a limited set of functions so that the customer may provide subscription information. For example, the MCS may be activated to allow the customer to enter billing and account information to pay for the service. In other examples, the customer may be provided with services for a limited period to evaluate the MCS, or the customer may have full services of the MCS by virtue of their subscription to the OSP.

The MCS is associated with the identity (step 860). Aspects of associating the identity with the MCS typically correspond to aspects of step 730 in FIG. 7.

Payment information may be received (step 870). Generally, subscribing to an OSP involves providing one or more pieces of payment information that enable the OSP to receive reimbursement for providing service. In one example, the payment information may include a credit card that enables resources to be electronically transferred. In another example, a billing address is provided as payment information.

Other implementations are within the scope of the following claims. In particular, in some implementations, the identity may be preloaded into a MCS without requiring the activation request to be forwarded to a database of screen names.

Still further, the client, host, and network also may be distributed across different entities in the communications system and may make use of one or more agents and/or proxies to perform certain functions.

What is claimed is:

1. A method of activating a mobile communications system for a user, the method comprising:

receiving, from a client accessing the Internet, a message originating from a messaging account that is associated with a user identifier for a user requesting mobile services;

referencing an unassigned system identifier for an unassigned mobile communications system;

associating the user identifier with the unassigned system identifier so that the mobile communications system now has an assigned system identifier;

configuring the unassigned mobile communications system to be an assigned mobile communications system configured to support the user identifier;

receiving, from the assigned mobile communications system and over a wireless network, an activation request that includes a received system identifier of the mobile communications system and the user identifier supported by the mobile communications system;

comparing the received system identifier and the received user identifier to the assigned system identifier and the user identifier to determine whether the received system identifier and the received user identifier relate to the assigned system identifier and the user identifier;

activating, based on a determination that the received system identifier and the received user identifier relate to the assigned system identifier and the user identifier, the assigned mobile communications system; and enabling, in response to activating the assigned mobile communications system, the user to access the messaging account from the mobile communications system, wherein the client and the mobile communications system are separate and distinct from each other.

2. The method of claim 1 wherein receiving the message includes receiving communications submitted by a browser on the client.

3. The method of claim 1 wherein receiving the message includes receiving a purchase instruction that is associated with the user identifier.

4. The method of claim 1 wherein referencing the unassigned system identifier for the unassigned mobile communications system includes receiving the unassigned system identifier from an equipment provider configured to deliver the assigned mobile communications system to the user.

5. The method of claim 1 wherein configuring the unassigned mobile communications system to be the assigned mobile communications system configured to support the user identifier includes configuring services associated with the user identifier to be accessible from the assigned mobile communications system.

6. The method of claim 1 wherein associating the user identifier with the unassigned system identifier includes associating the user identifier with the unassigned system identifier in a database of an online operator.

7. The method of claim 1 wherein the user identifier comprises at least one of a login name, an online account name, an electronic mail address, an instant messenger name, a profile name, and a screen name.

8. The method of claim 1 wherein the assigned mobile communications system is preloaded with one or applications incident to the message by an online operator prior to shipping the assigned mobile communications system to the user.

9. The method of claim 1 wherein activating the assigned mobile communication system includes loading a profile associated with the user requesting activation, the profile personalizing one or more applications on the mobile communications system.

10. The method of claim 1 wherein comparing the received system identifier and the received user identifier to the assigned system identifier and the user identifier includes enabling the assigned mobile communications system to access a database of user identities and system identifiers upon receipt of the user identifier from the assigned mobile communications system.

11. The method of claim 1 wherein receiving the message includes receiving purchase communication requesting use of a new wireless phone.

12. A system configured to activate a mobile communications system for a user, the system including a processor structured and arranged to:

receive, from a client accessing the Internet, a message originating from a messaging account that is associated with a user identifier for a user requesting mobile services;

reference an unassigned system identifier for an unassigned mobile communications system;

associate the user identifier with the unassigned system identifier so that the mobile communications system now has an assigned system identifier;

configure the unassigned mobile communications system to be an assigned mobile communications system configured to support the user identifier;

receive, from the assigned mobile communications system and over a wireless network, an activation request that includes a received system identifier of the mobile communications system and the user identifier supported by the mobile communications system;

compare the received system identifier and the received user identifier to the assigned system identifier and the user identifier to determine whether the received system identifier and the received user identifier relate to the assigned system identifier and the user identifier;

activate, based on a determination that the received system identifier and the received user identifier relate to the assigned system identifier and the user identifier, the assigned mobile communications system; and enable, in response to activating the assigned mobile communications system, the user to access the messaging account from the mobile communications system, wherein the client and the mobile communications system are separate and distinct from each other.

13. The system of claim 12 wherein receiving the message includes receiving communications submitted by a browser on the client.

14. The system of claim 12 wherein receiving the message includes receiving a purchase instruction that is associated with the user identifier.

15. The system of claim 12 wherein referencing the unassigned system identifier for the unassigned mobile communications system includes receiving the unassigned system identifier from an equipment provider configured to deliver the assigned mobile communications system to the user.

16. The system of claim 12 wherein configuring the unassigned mobile communications system to be the assigned mobile communications system configured to support the user identifier includes configuring services associated with the user identifier to be accessible from the assigned mobile communications system.

17. The system of claim 12 wherein associating the user identifier with the unassigned system identifier includes associating the user identifier with the unassigned system identifier in a database of an online operator.

18. The system of claim 12 wherein the user identifier comprises at least one of a login name, an online account name, an electronic mail address, an instant messenger name, a profile name, and a screen name.

19. The system of claim 12 wherein the assigned mobile communications system is preloaded with one or applications incident to the message by an online operator prior to shipping the assigned mobile communications system to the user.

20. The system of claim 12 wherein activating the assigned mobile communication system includes loading a profile associated with the user requesting activation, the profile personalizing one or more applications on the mobile communications system.

21. The system of claim 12 wherein comparing the received system identifier and the received user identifier to the assigned system identifier and the user identifier includes enabling the assigned mobile communications system to access a database of user identities and system identifiers upon receipt of the user identifier from the assigned mobile communications system.

22. The system of claim 12 wherein receiving the message includes receiving purchase communication requesting use of a new communications system that the user has not previously accessed.

23. A system for activating a communications device for a user, the system comprising:

means for receiving, from a client accessing the Internet, a message originating from a messaging account that is associated with a user identifier for a user requesting mobile services;

means for referencing an unassigned system identifier for an unassigned mobile communications system;

means for associating the user identifier with the unassigned system identifier so that the mobile communications system now has an assigned system identifier;

means for configuring the unassigned mobile communications system to be an assigned mobile communications system configured to support the user identifier;

means for receiving, from the assigned mobile communications system and over a wireless network, an activation request that includes a received system identifier of the mobile communications system and the user identifier supported by the mobile communications system;

means for comparing the received system identifier and the received user identifier to the assigned system identifier and the user identifier to determine whether the received system identifier and the received user identifier relate to the assigned system identifier and the user identifier;

means for activating, based on a determination that the received system identifier and the received user identifier relate to the assigned system identifier and the user identifier, the assigned mobile communications system; and means for enabling, in response to activating the assigned mobile communications system, the user to access the messaging account from the mobile communications system, wherein the client and the mobile communications system are separate and distinct from each other.

24. The system of claim 23 wherein the user identifier comprises at least one of a login name, an online account name, an electronic mail address, an instant messenger name, a profile name, and a screen name.

* * * * *